United States Patent
Aritomi et al.

(10) Patent No.: US 12,283,438 B2
(45) Date of Patent: Apr. 22, 2025

(54) ELECTROLYTIC CAPACITOR

(71) Applicant: Murata Manufacturing Co., Ltd., Nagaokakyo (JP)

(72) Inventors: Katsutomo Aritomi, Nagaokakyo (JP); Wataru Onishi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/657,152

(22) Filed: Mar. 30, 2022

(65) Prior Publication Data

US 2022/0223350 A1 Jul. 14, 2022
US 2023/0215664 A9 Jul. 6, 2023

Related U.S. Application Data

(63) Continuation of application No. PCT/JP2020/037410, filed on Oct. 1, 2020.

(30) Foreign Application Priority Data

Oct. 4, 2019 (JP) .................. 2019-183946

(51) Int. Cl.
*H01G 9/15* (2006.01)
*H01G 9/012* (2006.01)
(Continued)

(52) U.S. Cl.
CPC .............. *H01G 9/15* (2013.01); *H01G 9/012* (2013.01); *H01G 9/0425* (2013.01);
(Continued)

(58) Field of Classification Search
CPC ..................................... H01G 9/012
See application file for complete search history.

(56) References Cited

U.S. PATENT DOCUMENTS

2002/0001169 A1   1/2002   Shiraishi et al.
2010/0165547 A1*  7/2010   Kuranuki ............... H01G 9/012
                                                                361/525
(Continued)

FOREIGN PATENT DOCUMENTS

JP    H1092695    *   4/1998
JP    2001192437 A *   7/2001
(Continued)

OTHER PUBLICATIONS

International Search Report issued for PCT/JP2020/037410, date of mailing Dec. 8, 2020.

*Primary Examiner* — Eric W Thomas
(74) *Attorney, Agent, or Firm* — ArentFox Schiff LLP

(57) ABSTRACT

An electrolytic capacitor that includes: a cuboid resin molded body having a first end surface and a second end surface opposite to each other; a first external electrode on the first end surface and electrically connected to an exposed end of an anode; and a second external electrode on the second end surface and electrically connected to an exposed end of a cathode, wherein at least one of the first and second external electrodes has a multilayer structure including: an inner plating layer; and a resin electrode layer on the inner plating layer and containing a resin component and at least one metal selected from Ni, Cu, and Ag, and a total number of layers defining each of the first and second external electrodes is four or less.

8 Claims, 1 Drawing Sheet

Cross-section A-A

(51) Int. Cl.
*H01G 9/042* (2006.01)
*H01G 9/048* (2006.01)
*H01G 9/08* (2006.01)
*H01G 9/10* (2006.01)

(52) U.S. Cl.
CPC .............. *H01G 9/048* (2013.01); *H01G 9/08* (2013.01); *H01G 9/10* (2013.01)

(56) References Cited

U.S. PATENT DOCUMENTS

| | | |
|---|---|---|
| 2017/0250026 A1 | 8/2017 | Mizuno |
| 2019/0287727 A1 | 9/2019 | Tomohiro et al. |
| 2020/0266005 A1* | 8/2020 | Suzuki ................. H01G 9/0032 |

FOREIGN PATENT DOCUMENTS

| | | | | | |
|---|---|---|---|---|---|
| JP | 2002319522 | A | | 10/2002 | |
| JP | 2004063543 | A | * | 2/2004 | ............ H01G 2/065 |
| JP | 2005045007 | A | * | 2/2005 | ............ H01G 9/012 |
| JP | 2005217126 | A | | 8/2005 | |
| JP | 2007073883 | A | | 3/2007 | |
| JP | 2012004480 | A | | 1/2012 | |
| JP | 2014120382 | A | | 6/2014 | |
| JP | 2017152620 | A | | 8/2017 | |
| JP | 2017191884 | A | * | 10/2017 | ............ H01G 2/065 |
| WO | 2018105364 | A1 | | 6/2018 | |
| WO | 2019065870 | A1 | | 4/2019 | |

\* cited by examiner

Cross-section A-A

ELECTROLYTIC CAPACITOR

CROSS REFERENCE TO RELATED APPLICATIONS

The present application is a continuation of International application No. PCT/JP2020/037410, filed Oct. 1, 2020, which claims priority to Japanese Patent Application No. 2019-183946, filed Oct. 4, 2019, the entire contents of each of which are incorporated herein by reference.

FIELD OF THE INVENTION

The present invention relates to electrolytic capacitors.

BACKGROUND OF THE INVENTION

Patent Literature 1 discloses a multilayer ceramic capacitor.

This multilayer ceramic capacitor is produced by dipping a first surface and a second surface of a capacitor body in an electrode paste, drying and baking the electrode paste to form a first base film for an external electrode, printing the electrode paste on both end portions of a fifth surface of the capacitor body in the length direction, drying and baking the electrode paste to form a second base film for an external electrode to be continuous with the first base film.

Patent Literature 2 discloses a method of forming an external electrode on a ceramic capacitor. Specifically, the method includes a first paste layer forming step of performing screen printing on an end surface of a body and a second paste layer forming step of performing screen printing on a main surface of the body, wherein the first paste layer forming step is followed by a first baking step, and the second paste layer forming step is followed by a second baking step.

Patent Literature 1: JP 2017-152620 A
Patent Literature 2: JP 2012-4480 A

SUMMARY OF THE INVENTION

According to the techniques disclosed in Patent Literatures 1 and 2, an electrode paste is screen printed on a ceramic body, and subsequently, baking is performed at a high temperature of 600° C. to 800° C. The electrode paste composition, electrode paste rheology, electrode paste printing conditions, and the like are suitable for the baking.

An electrolytic capacitor such as a solid electrolytic capacitor may have a configuration in which a stack including a capacitor element with an anode having a dielectric layer on a surface thereof and a cathode opposite to the anode is sealed in a resin molded body, and external electrodes are formed on the resin molded body.

When forming the external electrode on the resin molded body, an electrode layer cannot be formed by baking or the like at a high temperature, so that it is difficult to improve adhesion between the resin molded body and the electrode layer. Thus, the external electrode formation methods disclosed in Patent Literatures 1 and 2 cannot be used directly.

Thus, suggested is formation of external electrodes on a surface of a resin molded body by a method including forming an inner plating layer in direct contact with a cathode or an anode, an outer plating layer in direct contact with a solder, and a resin electrode layer for preventing cracking of the external electrode. The resin electrode layer is placed between the inner plating layer and the outer plating layer.

The inner plating layer is required to have high adhesion to the anode or the cathode. A Ni plating has excellent adhesion to the anode and the cathode, but is easily oxidized. In response to the problem, suggested is formation of the inner plating layer having a two-layer structure of a Ni plating layer and a plating layer for preventing the oxidation of the Ni plating (e.g., an Ag plating layer).

The outer plating layer is required to have high solder wettability. However, when a Sn plating layer having high solder wettability is directly formed on a surface of the resin electrode layer, the Sn plating layer has poor adhesion to the resin electrode layer. Thus, the outer plating layer is required to be formed by forming first a Ni plating layer on the surface of the resin electrode layer, followed by forming a Sn plating layer on the surface of the Ni plating layer.

This provides an external electrode having a five-layer structure including two inner plating layers (Ni/Ag), a resin electrode layer, and two outer plating layers (Ni/Sn).

The external electrode having such a structure may increase the production cost due to too many electrode layers.

In addition, due to many interfaces between the electrode layers, the interface resistance may increase the ESR.

The present invention aims to provide an electrolytic capacitor capable of preventing an increase in the production cost and an increase in the ESR.

The present invention provides an electrolytic capacitor including: a cuboid resin molded body having a first end surface and a second end surface opposite to each other, the cuboid resin molded body including a stack that includes a capacitor element with an anode having a dielectric layer on a surface thereof and a cathode opposite to the anode, and a sealing resin that seals the stack, the anode being exposed on the first end surface and the cathode being exposed at the second end surface; a first external electrode on the first end surface of the resin molded body and electrically connected to the anode exposed on the first end surface; and a second external electrode on the second end surface of the resin molded body and electrically connected to the cathode exposed on the second end surface, wherein at least one of the first external electrode or the second external electrode has a multilayer structure including: an inner plating layer on a surface of the anode exposed on the first end surface or on a surface of the cathode exposed on the second end surface; and a resin electrode layer on a surface of the inner plating layer and containing a resin component and at least one metal selected from the group consisting of Ni, Cu, and Ag, and a total number of layers defining each of the first external electrode and the second external electrode is four or less.

The present invention provides an electrolytic capacitor capable of preventing an increase in the production cost and an increase in the ESR.

DESCRIPTION OF THE PREFERRED EMBODIMENTS

An electrolytic capacitor of the present invention is described below.

The present invention is not limited to the following preferred embodiments, and may be suitably modified without departing from the gist of the present invention. Combinations of two or more preferred features described in the following preferred embodiments are also within the scope of the present invention.

Figure 1:
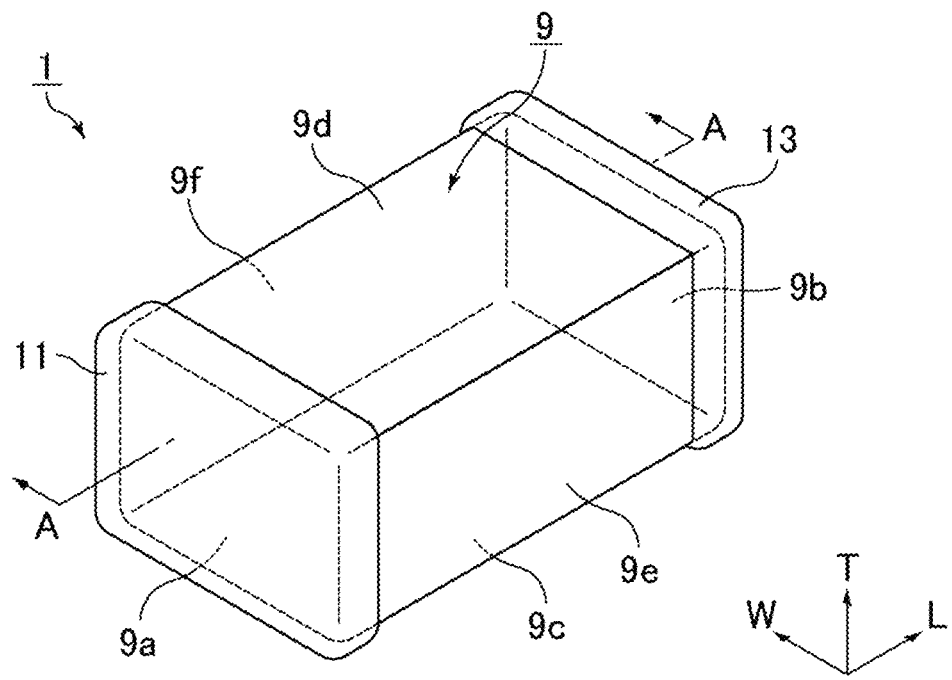
FIG. 1 is a schematic perspective view of an example of an electrolytic capacitor of the present invention.

FIG. 1 is a schematic perspective view of an example of the electrolytic capacitor of the present invention.

FIG. 1 shows a cuboid resin molded body 9 of an electrolytic capacitor 1.

The resin molded body 9 has a length direction (L direction), a width direction (W direction), and a thickness direction (T direction), and includes a first end surface 9a and a second end surface 9b which are opposite to each other in the length direction. A first external electrode 11 is formed on the first end surface 9a, and a second external electrode 13 is formed on the second end surface 9b.

The resin molded body 9 includes a bottom surface 9c and a top surface 9d which are opposite to each other in the thickness direction.

The resin molded body 9 also includes a first side surface 9e and a second side surface 9f which are opposite to each other in the width direction.

Herein, a plane along the length direction (L direction) and the thickness direction (T direction) of the electrolytic capacitor or the resin molded body is referred to as an "LT plane", a plane along the length direction (L direction) and the width direction (W direction) is referred to as an "LW plane", and a plane along the thickness direction (T direction) and the width direction (W direction) is referred to as a "WT plane".

Figure 2:
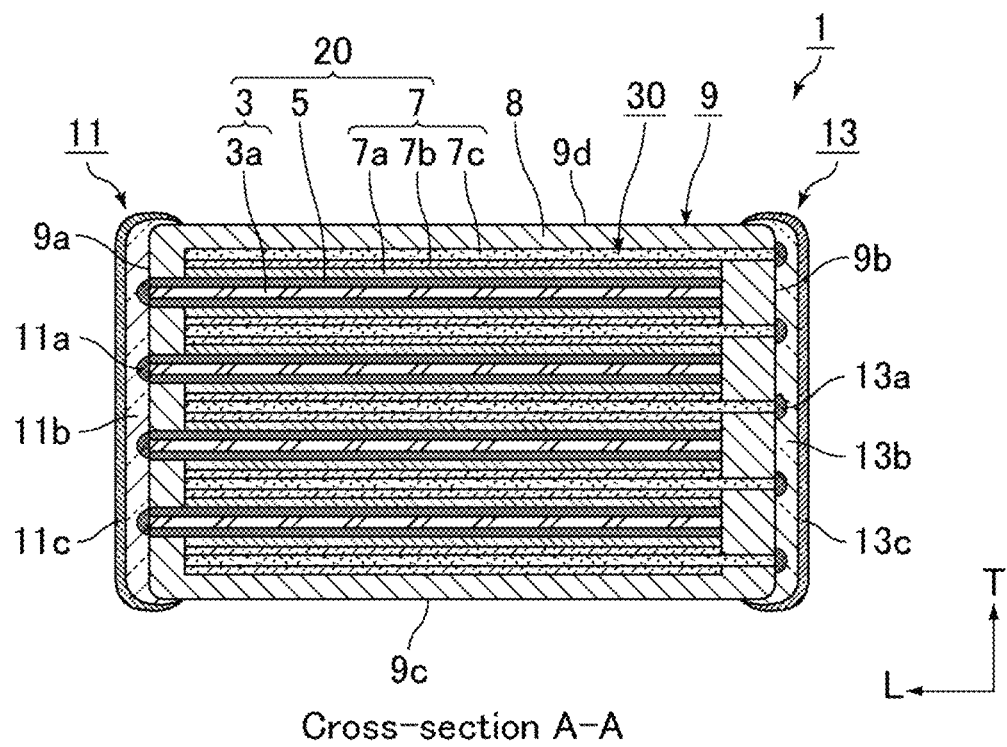
FIG. 2 is a cross-sectional view taken along line A-A of the electrolytic capacitor shown in FIG. 1.

FIG. 2 is a cross-sectional view taken along line A-A of the electrolytic capacitor shown in FIG. 1.

A capacitor element 20 includes an anode 3 having a dielectric layer 5 on a surface thereof and a cathode 7 opposite to the anode 3.

Multiple such capacitor elements 20 are stacked to form a stack 30, and the stack 30 is sealed in a sealing resin 8 to obtain the resin molded body 9. In the stack 30, the stacked capacitor elements 20 may be bonded to each other via a conductive adhesive (not shown).

The first external electrode 11 is formed on the first end surface 9a of the resin molded body 9, and the first external electrode 11 is electrically connected to the anode 3 exposed on the first end surface 9a.

The second external electrode 13 is formed on the second end surface 9b of the resin molded body 9, and the second external electrode 13 is electrically connected to the cathode 7 exposed on the second end surface 9b.

A second end surface 9b-side end of a valve-action metal foil 3a of the capacitor element 20 is sealed with the sealing resin 8, and the valve-action metal foil 3a is not in direct contact with a solid electrolyte layer 7a or a conductive layer 7b. When the second end surface 9b-side end of the valve-action metal foil 3a is insulated, for example, by being covered with the dielectric layer 5, the second end surface 9b-side end of the valve-action metal foil 3a may be covered with the solid electrolyte layer 7a and the conductive layer 7b.

The anode 3 defining the capacitor element 20 includes the valve-action metal foil 3a at a center thereof and a porous layer such as an etched layer (not shown) on a surface thereof. The dielectric layer 5 is provided on a surface of the porous layer.

Examples of the valve-action metal include elemental metals such as aluminum, tantalum, niobium, titanium, zirconium, magnesium, and silicon, and alloys containing these metals. Of these, aluminum and an aluminum alloy are preferred.

The valve-action metal may have any shape, but it is preferably flat, and is more preferably in the form of foil. Preferably, the porous layer is an etched layer that has been etched with hydrochloric acid or the like.

The thickness of the valve-action metal foil before etching is preferably 60 µm to 180 µm. The thickness of the non-etched valve-action metal foil (core) after etching is preferably 10 µm to 70 µm. The thickness of the porous layer is designed according to the withstand voltage and capacitance required for the electrolytic capacitor, but the thickness of the porous layer including the porous layers on both sides of the valve-action metal foil is preferably 10 µm to 120 µm.

The anode 3 is led out to the first end surface 9a of the resin molded body 9 and electrically connected to the first external electrode 11.

Preferably, the dielectric layer is formed of an oxide film of the valve-action metal. For example, when aluminum foil is used as a valve-action metal substrate, the aluminum foil is anodized in an aqueous solution containing boric acid, phosphoric acid, adipic acid, a sodium salt or an ammonium salt thereof, or the like, whereby an oxide film that serves as a dielectric layer can be formed.

The dielectric layer is formed along the surface of the porous layer, whereby pores (recesses) are formed in the dielectric layer. The thickness of the dielectric layer is designed according to the withstand voltage and capacitance required for the electrolytic capacitor, but the thickness of the dielectric layer is preferably 10 nm to 100 nm.

The cathode 7 of the capacitor element 20 is a stack including the solid electrolyte layer 7a on the dielectric layer 5, the conductive layer 7b on the solid electrolyte layer 7a, and a cathode lead-out layer 7c on the conductive layer 7b.

The electrolytic capacitor including a solid electrolyte layer as part of the cathode can be considered to be a solid electrolytic capacitor.

Examples of materials defining the solid electrolyte layer include conductive polymers having a skeleton of pyrrole, thiophene, aniline, or the like. A conductive polymer having a thiophene skeleton is, for example, poly(3,4-ethylenedioxythiophene) (PEDOT), or may be PEDOT:PSS which is a complex with a dopant (poly(styrene sulfonate) (PSS)).

The solid electrolyte layer is formed by, for example, a method in which a polymerized film of poly(3,4-ethylenedioxythiophene) or the like is formed on a surface of the dielectric layer using a treatment liquid containing a monomer such as 3,4-ethylenedioxythiophene or a method in which a dispersion of a polymer such as poly(3,4-ethylenedioxythiophene) is applied to a surface of the dielectric layer and dried. Preferably, a solid electrolyte layer for an inner layer for filling the pores (recesses) is formed first, and then a solid electrolyte layer for an outer layer for covering the entire dielectric layer is formed.

The solid electrolyte layer can be formed in a predetermined region by applying the treatment liquid or dispersion to the dielectric layer by, for example, sponge transfer, screen printing, spray coating, dispensing, or inkjet printing. The thickness of the solid electrolyte layer is preferably 2 µm to 20 µm.

The conductive layer is provided to electrically and mechanically connect the solid electrolyte layer to the cathode lead-out layer. For example, the conductive layer is preferably a carbon layer, a graphene layer, or a silver layer formed by applying a conductive paste such as a carbon paste, a graphene paste, or a silver paste. The conductive layer may be a composite layer in which a silver layer is provided on a carbon layer or a graphene layer, or a mixed layer containing a mixture of a carbon paste or a graphene paste with a silver paste.

The conductive layer can be formed on the solid electrolyte layer by applying a conductive paste such as a carbon paste by, for example, sponge transfer, screen printing, spray coating, dispensing, or inkjet printing. Preferably, a cathode lead-out layer formed in a subsequent step is stacked while the conductive layer is viscous before drying. The thickness of the conductive layer is preferably 2 μm to 20 μm.

The cathode lead-out layer can be formed from metal foil or a printed electrode layer.

In the case of the metal foil, the metal foil preferably contains at least one metal selected from the group consisting of Al, Cu, Ag, and an alloy mainly containing any of these metals. When the metal foil contains any of these metals, the metal foil can have a lower resistance value, and the ESR can be reduced.

Alternatively, the metal foil may be one whose surface is coated with carbon or titanium by a film forming method such as sputtering or vapor deposition. Use of carbon-coated Al foil is more preferred. The thickness of the metal foil is not limited, but it is preferably 20 μm to 50 μm, in view of better handling during production, smaller size, and lower ESR.

In the case of the printed electrode layer, the cathode lead-out layer can be formed in a predetermined region by applying an electrode paste to the conductive layer by, for example, sponge transfer, screen printing, spray coating, dispensing, or inkjet printing. The electrode paste is preferably one mainly containing Ag, Cu, or Ni. When the cathode lead-out layer is a printed electrode layer, the printed electrode layer can made thinner than the cathode lead-out layer formed from metal foil. In the case of screen printing, the printed electrode layer can have a thickness of 2 μm to 20 μm.

The cathode lead-out layer 7c is led out to the second end surface 9b of the resin molded body 9 and electrically connected to the second external electrode 13.

The sealing resin 8 defining the resin molded body 9 contains at least a resin, and preferably contains a resin and a filler. Preferably, examples of the resin include epoxy resins, phenolic resins, polyimide resins, silicone resins, polyamide resins, and liquid crystal polymers. The sealing resin 8 can be used in the form of either a solid resin or a liquid resin. Preferably, examples of the filler include silica particles, alumina particles, and metal particles. Use of a material obtained by adding silica particles to a solid epoxy resin and/or a phenolic resin is more preferred.

When a solid sealing material is used, preferably, the molding method of the resin molded body uses a resin mold such as a compression mold or a transfer mold. Use of a compression mold is more preferred. When a liquid sealing material is used, use of a molding method such as dispensing or printing is preferred. Preferably, a compression mold is used to seal the stack 30 of the capacitor elements 20 each including the anode 3, the dielectric layer 5, and the cathode 7 in the sealing resin 8 to obtain the resin molded body 9.

The resin molded body 9 has a cuboid shape, and includes the top surface 9d and the bottom surface 9c as the LW planes, the first side surface 9e and the second side surface 9f as the LT planes, and the first end surface 9a and the second end surface 9b as the WT planes.

In the resin molded body 9, corner portions are rounded to have an R (curvature radius) by barrel polishing after molding in a resin mold. A resin molded body is softer than a ceramic body and it is thus difficult to round each corner to have an R by barrel polishing. Yet, each corner can be rounded to have a small R by adjusting the composition, particle size, and shape of a medium, treatment time in a barrel, and the like.

The following specifically describes the configurations of the external electrodes included in the electrolytic capacitor of the present invention.

At least one of the first external electrode or the second external electrode of the electrolytic capacitor of the present invention has a multilayer structure including an inner plating layer and a resin electrode layer formed on a surface of the inner plating layer and containing a resin component and at least one metal selected from the group consisting of Ni, Cu, and Ag.

Preferably, the first external electrode has the multilayer structure including the inner plating layer formed on the surface of the anode exposed on the first end surface and the resin electrode layer formed on the surface of the inner plating layer and containing a resin component and at least one metal selected from the group consisting of Ni, Cu, and Ag.

A plating layer other than the above layers may be optional. The following describes the first external electrode and the second external electrode each including an inner plating layer, a resin electrode layer, and an outer plating layer with reference to FIG. 2.

The resin electrode layer shown in FIG. 2 is a printed resin electrode layer formed by screen printing an electrode paste.

FIG. 2 shows layer structures of the first external electrode 11 and the second external electrode 13 included in the electrolytic capacitor 1.

The first external electrode 11 includes an inner plating layer 11a, a resin electrode layer 11b, and an outer plating layer 11c. The resin electrode layer 11b is a printed resin electrode layer.

The second external electrode 13 includes an inner plating layer 13a, a resin electrode layer 13b, and an outer plating layer 13c. The resin electrode layer 13b is a printed resin electrode layer.

Thus, in the electrolytic capacitor 1 shown in FIG. 2, the first external electrode 11 and the second external electrode 13 each have a multilayer structure including an inner plating layer and a resin electrode layer formed on a surface of the inner plating layer and containing a resin component and at least one metal selected from the group consisting of Ni, Cu, and Ag.

In the electrolytic capacitor of the present invention, the total number of layers defining each of the first external electrode and the second external electrode is four or less.

Since, in the electrolytic capacitor of the present invention, the total number of layers defining each of the first external electrode and the second external electrode is four or less, an increase in the production cost and an increase in the ESR can be prevented.

As long as the total number of layers defining each of the first external electrode and the second external electrode is four or less, each inner plating layer may include two or more layers, and each outer plating layer may include two or more layers.

Preferably, the inner plating layers are formed thorough a zincate treatment. In other words, the surface of aluminum foil of the anode 3 exposed on the first end surface of the resin molded body 9 is alkaline etched to remove an oxide film of the anode 3, and Zn plating is then performed.

Subsequently, electroless Ni plating is performed as displacement plating, whereby the inner plating layer 11a is formed.

The inner plating layer on the surface of the cathode lead-out layer 7c can be formed in the same manner as for the inner plating layer formed on the surface of the anode 3. In this case, the zincate treatment may not be performed. When the cathode lead-out layer 7c contains Al, the zincate treatment is preferably performed.

The inner plating layers are each preferably a Ni plating layer, a Cu plating layer, or an Ag plating layer, more preferably a Ni plating layer.

When the inner plating layers each include two layers, each inner plating layer may include a first inner plating layer formed on the surface of the anode exposed on the first end surface or the surface of the cathode exposed on the second end surface of the resin molded body and a second inner plating layer formed on the surface of the first inner plating layer.

When the inner plating layers each include the first inner plating layer and the second inner plating layer, preferably, the first inner plating layer is a Ni plating layer and the second inner plating layer is an Ag plating layer.

When the inner plating layer is a Ni plating layer, preferably, the Ni plating layer has a thickness of 3 µm to 10 µm. When the first inner plating layer is a Ni plating layer, preferably, the Ni plating layer has a thickness of 3 µm to 10 µm.

The Ni plating layer having a thickness of 3 µm or more can prevent the valve-action metal foil and the dielectric layer from being corroded by a plating solution for forming the second inner plating layer. The Ni plating layer having a thickness of 10 µm or less can reduce the unevenness of the surface of the external electrodes, thereby securing the solder mountability.

The thickness of the Ni plating layer is determined by measuring the length of a line drawn in a direction perpendicular to the first end surface or the second end surface in a cross-sectional micrograph taken in a cross-section (LT plane) as shown in FIG. 2. The thickness of each of the Ni plating layers formed corresponding to the anodes and the cathode lead-out layers is determined by measuring the thicknesses of five or more portions of each Ni plating layer, and averaging the thicknesses.

The resin electrode layers 11b and 13b each contain a conductive component and a resin component.

Preferably, the resin component includes an epoxy resin, a phenolic resin, or the like as a main component.

Preferably, each resin electrode layer contains a conductive component in an amount of 67 wt % to 97 wt % and a resin component in an amount of 3 wt % to 33 wt %.

More preferably, the resin electrode layer contains a conductive component in an amount of 72 wt % to 95 wt % and a resin component in an amount of 5 wt % to 28 wt %.

Still more preferably, the resin electrode layer contains a conductive component in an amount of 78 wt % to 95 wt % and a resin component in an amount of 5 wt % to 22 wt %.

Particularly preferably, the resin electrode layer contains a conductive component in an amount of 79 wt % to 89 wt % and a resin component in an amount of 11 wt % to 21 wt %.

The conductive component in each of the resin electrode layers is at least one metal selected from the group consisting of Ni, Cu, and Ag.

The conductive component in each of the resin electrode layers may be an alloy.

Examples of an alloy containing at least one metal selected from the group consisting of Ni, Cu, and Ag include an Ag—Ni alloy, a Cu—Ni alloy, and a Sn—Ni alloy.

Each alloy may have any composition. Examples of the composition of the Sn—Ni alloy include $Ni_3Sn$, $Ni_3Sn_2$, and $Ni_3Sn_4$.

The conductive component in each of the resin electrode layers preferably includes Ni or a Ni alloy, more preferably Ni.

Preferably, each resin electrode layer is a printed resin electrode layer formed by screen printing an electrode paste. More preferably, the electrode paste is an electrode paste containing a resin and a conductive filler containing at least one metal, as conductive component(s), selected from the group consisting of Ni, Cu, and Ag, and each resin electrode layer is a printed resin electrode layer formed by screen printing.

When the resin electrode layer is a printed resin electrode layer, the external electrodes can be made flat, as compared to the case where the resin electrode is formed by dipping in an electrode paste. In other words, the first external electrode and the second external electrode have better thickness uniformity.

When the flatness of each of the first external electrode and the second external electrode is measured in a cross section as shown in FIG. 2, preferably, the variation in thickness of the first external electrode measured from the first end surface of the resin molded body and the variation in thickness of the second external electrode measured from the second end surface of the resin molded body are each 30 µm or less. More preferably, these variations in thickness are each 20 µm or less. Still more preferably, these variations in thickness are each 5 µm or less.

The variation in thickness of the first external electrode or the second external electrode can be determined from the difference between the maximum value and the minimum value of the thicknesses measured at five points: three points that divide the stack from a top surface to a bottom surface into four equal parts, the top surface, and the bottom surface, in the cross-sectional view shown in FIG. 2. Alternatively, the thicknesses at multiple points may be non-destructively measured using a fluorescent X-ray film thickness meter, a laser displacement meter, or the like.

When the resin electrode layers are printed resin electrode layers formed by screen printing an electrode paste, the electrode paste preferably contains a conductive component in an amount of 60 wt % to 95 wt % and a resin component in an amount of 3 wt % to 30 wt %.

More preferably, the electrode paste contains a conductive component in an amount of 65 wt % to 90 wt % and a resin component in an amount of 5 wt % to 25 wt %.

Still more preferably, the electrode paste contains a conductive component in an amount of 70 wt % to 90 wt % and a resin component in an amount of 5 wt % to 20 wt %.

Yet still more preferably, the electrode paste contains a conductive component in an amount of 75 wt % to 85 wt % and a resin component in an amount of 10 wt % to 20 wt %.

The electrode paste may contain an organic solvent, and the organic solvent is preferably a glycol ether-based solvent. Examples include diethylene glycol monobutyl ether and diethylene glycol monophenyl ether.

The electrode paste may also contain an additive, if necessary. The additive is effective in adjusting the rheology, especially thixotropy, of the electrode paste. The amount of the additive contained is preferably less than 5 wt % relative to the weight of the electrode paste.

An outer plating layer may be formed on the surface of the resin electrode layer.

Preferably, the outer plating layers are each a Ni plating layer or a Sn plating layer.

When the outer plating layers each include two layers, each outer plating layer may include a first outer plating layer formed on the surface of the resin electrode layer and a second outer plating layer formed on the surface of the first outer plating layer.

Preferably, the first outer plating layer is a Ni plating layer and the second outer plating layer is a Sn plating layer.

Examples of preferred ranges of the dimensions of the electrolytic capacitor of the present invention are as described below.

Dimensions of Electrolytic Capacitor

Dimension of L: 3.4 mm to 3.8 mm; representative value: 3.5 mm

Dimension of W: 2.7 mm to 3.0 mm; representative value: 2.8 mm

Dimension of T: 1.8 mm to 2.0 mm; representative value: 1.9 mm

The electrolytic capacitor of the present invention that has been described so far can be produced by the following method, for example.

Production of Capacitor Element

A valve-action metal foil, such as aluminum foil, having a porous layer such as an etched layer on a surface thereof is prepared, and a surface of the porous layer is anodized to form a dielectric layer.

A solid electrolyte layer is formed on the dielectric layer by screen printing. Subsequently, a carbon layer is formed on the solid electrolyte layer by screen printing, and further, a cathode lead-out layer is formed on the carbon layer by sheet stacking or screen printing.

A capacitor element is obtained by the above steps.

Stacking of capacitor elements and sealing with resin

Multiple capacitor elements are formed into a stack, and the stack is sealed in a sealing resin by a compression mold to produce a resin molded body.

Formation of External Electrodes

An inner plating layer is formed on each of the first end surface and the second end surface of the resin molded body through the zincate treatment and displacement plating.

The inner plating layer is preferably a Ni plating layer, a Cu plating layer, or an Ag plating layer, more preferably a Ni plating layer.

The inner plating layer may be formed on at least one of the surface of the anode exposed on the first end surface or the surface of the cathode exposed on the second end surface.

Subsequently, the electrode paste is screen printed on the first end surface of the resin molded body, and the electrode paste is then thermally cured to form the first external electrode.

In addition, the electrode paste is screen printed on the second end surface of the resin molded body, and the electrode paste is then thermally cured to form the second external electrode.

The electrode paste contains a conductive component and a resin component, and the resulting resin electrode layers are printed resin electrode layers.

Preferably, the electrode paste used in this step contains a conductive component in an amount of 67 wt % to 97 wt % and a resin component in an amount of 3 wt % to 33 wt %.

More preferably, the electrode paste contains a conductive component in an amount of 72 wt % to 95 wt % and a resin component in an amount of 5 wt % to 28 wt %.

Still more preferably, the electrode paste contains a conductive component in an amount of 78 wt % to 95 wt % and a resin component in an amount of 5 wt % to 22 wt %.

Still further more preferably, the electrode paste contains a conductive component in an amount of 79 wt % to 89 wt % and a resin component in an amount of 11 wt % to 21 wt %.

The electrode paste may contain an organic solvent, and the organic solvent is preferably a glycol ether-based solvent. Examples include diethylene glycol monobutyl ether and diethylene glycol monophenyl ether.

The electrode paste may also contain an additive, if necessary. The amount of the additive added is preferably less than 5 wt % relative to the weight of the electrode paste.

Subsequently, outer plating layers are formed.

When the inner plating layer is a single layer, preferably, the outer plating layers each include a Ni plating layer as the first outer plating layer and a Sn plating layer as the second outer plating layer.

The outer plating layers are formed on the printed resin electrode layers as the first external electrode and the second external electrode.

The electrolytic capacitor of the present invention can be obtained by the above steps.

In the electrolytic capacitor obtained through the above steps, the total number of layers defining each of the first external electrode and the second external electrode is four.

The stack including the capacitor element preferably includes multiple capacitor elements but the stack may include only one capacitor element.

EXAMPLES

The following shows examples of the electrolytic capacitor of the present invention in which the ESR was evaluated. The present invention is not limited to these examples.

The relationship between the ESR and the total number of layers defining each of the external electrodes was evaluated by the following procedure.

Preparation of Sample 1

The stack having a configuration shown in FIG. 1 and FIG. 2 was sealed in a sealing resin containing an epoxy resin and silica particles to obtain a resin molded body. Subsequently, a Ni plating layer (which was described as a first inner plating layer in Table 1 for convenience) was formed as an inner plating layer, and an electrode paste was applied to the end surfaces (the first end surface and the second end surface) of the resin molded body by screen printing, and was thermally cured at a drying temperature of 150° C. or higher and 200° C. or lower. Thus, resin electrode layers were formed. Further, a Ni plating layer as the first outer plating layer and a Sn plating layer as the second outer plating layer were formed on a surface of each of the resin electrode layers to prepare a sample 1.

The electrode paste had a formulation consisting of 50 wt % of Ni powder, 17 wt % of a phenolic resin, 6 wt % of an additive, 20 wt % of diethylene glycol monobutyl ether as a solvent, and 7 wt % of diethylene glycol monophenyl ether as a solvent.

Sample 2

A sample 2 was prepared in the same manner as for the sample 1, except that the formulations of the first external electrode and the second external electrode were changed according to Table 1.

An Ag paste used in the preparation of the sample 2 had a formulation consisting of 50 wt % of Ag powder, 17 wt % of a phenolic resin, 6 wt % of an additive, 20 wt % of diethylene glycol monobutyl ether as a solvent, and 7 wt % of diethylene glycol monophenyl ether as a solvent.

Measurement of ESR

The ESRs of the sample 1 and the sample 2 were measured using an impedance analyzer. Table 1 shows the results.

TABLE 1

|  |  | Sample 1 | Sample 2* |
|---|---|---|---|
| Inner plating layer | First inner plating layer | Ni | Ni |
|  | Second inner plating layer | — | Ag |
| Resin electrode layer | Conductive component | Ni | Ag |
|  | Percentage [wt %] | 74.6 | 74.6 |
| Outer plating layer | First outer plating layer | Ni | Ni |
|  | Second outer plating layer | Sn | Sn |
| Total number of layers defining each external electrode |  | 4 | 5 |
| ESR [mΩ] |  | 45 | 50 |

*Sample 2 is a sample that does not correspond to the electrolytic capacitor of the present invention.

As shown in Table 1, ESR can be reduced in the case where each resin electrode layer contains one or more metals selected from the group consisting of Ni, Cu, and Ag as conductive material(s) and each external electrode includes not greater than four layers.

REFERENCE SIGNS LIST

1: electrolytic capacitor
3: anode
3a: valve-action metal foil
5: dielectric layer
7: cathode
7a: solid electrolyte layer
7b: conductive layer
7c: cathode lead-out layer
8: sealing resin
9: resin molded body
9a: first end surface of resin molded body
9b: second end surface of resin molded body
9c: bottom surface of resin molded body
9d: top surface of resin molded body
9e: first side surface of resin molded body
9f: second side surface of resin molded body
11: first external electrode
11a, 13a: inner plating layer
11b, 13b: resin electrode layer (printed resin electrode layer)
11c, 13c: outer plating layer
13: second external electrode
20: capacitor element
30: stack

The invention claimed is:

1. An electrolytic capacitor comprising:
a cuboid resin molded body having a first end surface and a second end surface opposite to each other, the cuboid resin molded body including a stack that includes a capacitor element with an anode having a dielectric layer on a surface thereof and a cathode opposite to the anode, and a sealing resin that seals the stack, the anode being exposed on the first end surface and the cathode being exposed at the second end surface;
a first external electrode on the first end surface of the resin molded body and electrically connected to the anode exposed on the first end surface; and
a second external electrode on the second end surface of the resin molded body and electrically connected to the cathode exposed on the second end surface,
wherein each of the first external electrode or the second external electrode has a multilayer structure including:
an inner plating layer on a surface of the anode exposed on the first end surface or on a surface of the cathode exposed on the second end surface; and
a resin electrode layer on a surface of the inner plating layer and containing a resin component and at least one metal selected from the group consisting of Ni or a Ni alloy,
the inner plating layer is a Ni plating layer having a thickness of 3 μm to 10 μm, the anode of the capacitor element includes a valve-action metal foil,
the inner plating layer of the first external electrode is only on and around an end of the valve-action metal foil exposed on the first end surface so that a part of the resin electrode layer of the first external electrode is in contact with the first end surface,
the resin electrode layer of the first external electrode is electrically connected to the inner plating layer of the first external electrode,
the cathode of the capacitor element includes a solid electrolyte layer on the dielectric layer, a conductive layer on the solid electrolyte layer, and a cathode lead-out layer on the conductive layer,
the cathode lead-out layer includes a metal foil or a printed electrode layer,
the inner plating layer of the second external electrode is only on and around an end of the metal foil or the printed electrode layer exposed on the second end surface so that a part of the resin electrode layer of the second external electrode is in contact with the second end surface,
the resin electrode layer of the second external electrode is electrically connected to the inner plating layer of the second external electrode,
a total number of layers defining each of the first external electrode and the second external electrode is four or less, and
a variation in thickness of the first external electrode measured from the first end surface of the resin molded body and a variation in thickness of the second external electrode measured from the second end surface of the resin molded body are each 20 μm or less.

2. The electrolytic capacitor according to claim 1, wherein the resin component includes an epoxy resin or a phenolic resin as a main component thereof.

3. The electrolytic capacitor according to claim 1, wherein the resin electrode layer contains the resin component in an amount of 3 wt % to 33 wt %.

4. The electrolytic capacitor according to claim 3, wherein the resin electrode layer contains the resin component in an amount of 5 wt % to 28 wt %.

5. The electrolytic capacitor according to claim 3, wherein the resin electrode layer contains the resin component in an amount of 5 wt % to 22 wt %.

6. The electrolytic capacitor according to claim 3, wherein the resin electrode layer contains the resin component in an amount of 11 wt % to 21 wt %.

7. The electrolytic capacitor according to claim 1, further comprising an outer plating layer on a surface of the resin electrode layer.

8. The electrolytic capacitor according to claim 7, wherein the outer plating layer includes at least one of a Ni plating layer or a Sn plating layer.

* * * * *